Oct. 23, 1962 R. B. ST. DENNY ETAL 3,059,920
COLLATING MACHINE
Filed Feb. 29, 1960
7 Sheets-Sheet 1

INVENTORS
RALPH B. ST. DENNY
FRANK H. BROWN
BY
Shoemaker and Mattare
ATTORNEYS

Oct. 23, 1962 R. B. ST. DENNY ETAL 3,059,920
COLLATING MACHINE
Filed Feb. 29, 1960 7 Sheets-Sheet 6

INVENTORS
RALPH B. ST. DENNY
FRANK H. BROWN
BY
Shoemaker and Mattare
ATTORNEYS

INVENTORS
RALPH B. ST. DENNY
FRANK H. BROWN
ATTORNEYS

United States Patent Office 3,059,920
Patented Oct. 23, 1962

3,059,920
COLLATING MACHINE
Ralph B. St. Denny and Frank H. Brown, Norwich, N.Y., assignors to Norwich Manufacturing Company, Inc., Norwich, N.Y., a corporation of New York
Filed Feb. 29, 1960, Ser. No. 11,612
28 Claims. (Cl. 270—58)

This invention relates to collating machines in general and more particularly relates to a machine of the character whose purpose is to properly correlate a plurality of printed sheets in stacked relationship for ultimate disposition into pamphlet or booklet form.

More particularly, the present invention has to do with a machine particularly useful in the printing trade and more especially for the purpose of providing stacks of properly correlated individual printed paper sheets which are to be secured together in book-like form.

Basically, an object of the present invention is to provide a machine of this character which operates on simpified principle so as to be devoid of any tendency for unusual maintenance problems and in which the machine may be set up for a particular job and operated continuously without difficulties or maintenance problems and which, at the same time, will rapidly and efficiently achieve the purposes intended.

There are various collating machines commercially available which are effective to achieve a stacking of individual printed sheets for disposition into booklet or pamphlet form or the like. However, such machines are normally characterized by an unusual amount of complexity and, ancillary thereto, their initial cost is relatively high. For this reason, many print shops cannot afford to purchase such machines, even though their possession would be extremely desirable for many jobs. Consequently, smaller print shops, in particular, may find it necessary to farm out the collating of printed sheets or this work must be done by hand, the latter of which, of course, is an extremely slow process and the former of which reduces the margin of profit for the particular job involved.

A further object of the present invention is to provide a machine of the character described employing a series of vertically disposed bins for receiving sequential sheets which are to be disposed in correlated stacks, with mechanism associated with the bins for periodically dispensing a single sheet from each of the vertically disposed bins simultaneously so that the sheets in these bins are expelled into stacked relationship, and with there further being means for receiving such dispensed sheets and associated mechanism for moving each sub-stack of sheets to the next stacking station and so on until a completed booklet or stack is formed. The machine may then have associated with it some means for securing the sheets together and means for folding the sheets, if such is desired.

Another object of this invention is to provide a drive assembly for operating the machine, which drive is characterized by its intermittent type of motion and also wherein the mechanism for effecting such motion is of simple and economical, yet highly efficient construction.

A further object of the invention resides in the subcombinational feature of the dispensing means for the individual bins, such dispensing means being so constructed and arranged as to effect a highly efficient and positive feeding action and yet which will display no tendency to damage or mar the individual sheets.

Another object of this invention is to provide a mechanism in accordance with the preceding object wherein the dispensing mechanism incorporates reciprocable arms associated with each bin, each such arm carrying a roller at its free end, which roller rests upon the uppermost sheet of a stack of similar sheets and with the arrangement and mounting of the roller being such that, as the roller is moved in a direction to dispense the sheet, the roller will be prevented from rotating so as to effectively and positively produce the dispensing action, there being a tensioning means associated with each arm so that when the roller is reciprocated in the return direction, the same will be tensioned against the stack of sheets with sufficient force to control the frictional drag of the roller and thereby produce a predetermined drag on the sheet with which it is contacted to thereby assure a proper positioning of such sheet in engagement with the back stop of the bin and to assure the separation of the top sheet from the remaining sheets in the stack by means of bending the sheet.

Another object of this invention is to provide a novel drive mechanism having plural power paths, one of which is continuously operating and the other of which is of intermittent motion characteristics. The continuous drive effects, through an eccentric mechanism, reciprocation of the dispensing arm means, whereas the intermittent drive effects operation of a conveying means for moving the collated stacks from one station to the next.

A further object in connection with the drive mechanism is to provide a divided power path gear train assembly which uses a minimum number of parts, readily available, so as to be characterized by its economical construction and yet which is effective to produce the desired motions.

A further object of the invention is to provide a drive mechanism of the character described wherein the dispensing means drive is provided with a parallel drive train including a modified epicyclic gear mechanism wherein the planetary motion is continuously reversed in direction in sinusoidal fashion so as to achieve an output which is characterized by its constantly varying angular velocity and which at one point entirely ceases, i.e. the angular velocity is zero, this motion being transmitted to the conveying means and correlated with the dispensing means such that the dispensing operation takes place properly in timed relationship with the conveying means as to dispense the collated sheets precisely at that time at which the conveying mechanism is stationary.

Still another object of this invention resides in a novel conveying arrangement wherein the conveying means includes an endless chain mechanism having upstanding fingers attached thereto which engage the edges of the stacks of collated sheets and move them in the intermittent fashion hereinbefore mentioned between one station and the next and in which there is associated with the chain means a flipper mechanism operated by the chain to periodically engage the edge of each stack opposite to that engaged by the conveying finger to straighten the stack and properly align the sheets thereof.

A further object of this invention resides in the provision of a novel conveying mechanism including a split table having upper and lower sections which are angulated and vertically offset, with there being a retaining crotch provided at and along the lower edge of the lower section and with the upper section being disposed vertically above the lower section so as to arch the individual sheets of a stack and thus lend some stiffness to such sheets for efficient conveying action thereon.

A further object of this invention resides in the provision of a conveying means in accordance with the immediately preceding object wherein the conveying fingers protrude upwardly between the upper and lower sections of the conveying platform or table so as to engage the stacks substantially midway between the opposite ends thereof and along one side edge of such stack.

The invention will be best understood from a consideration of the following detailed description taken in connection with the accompanying drawings with the understanding that the invention is not confined to a strict conformity with the showing of the but may be changed or modified so long as such changes or modifications mark no material departure from the salient features and spirit of the invention as expressly described hereinafter.

Figures 1, 2:
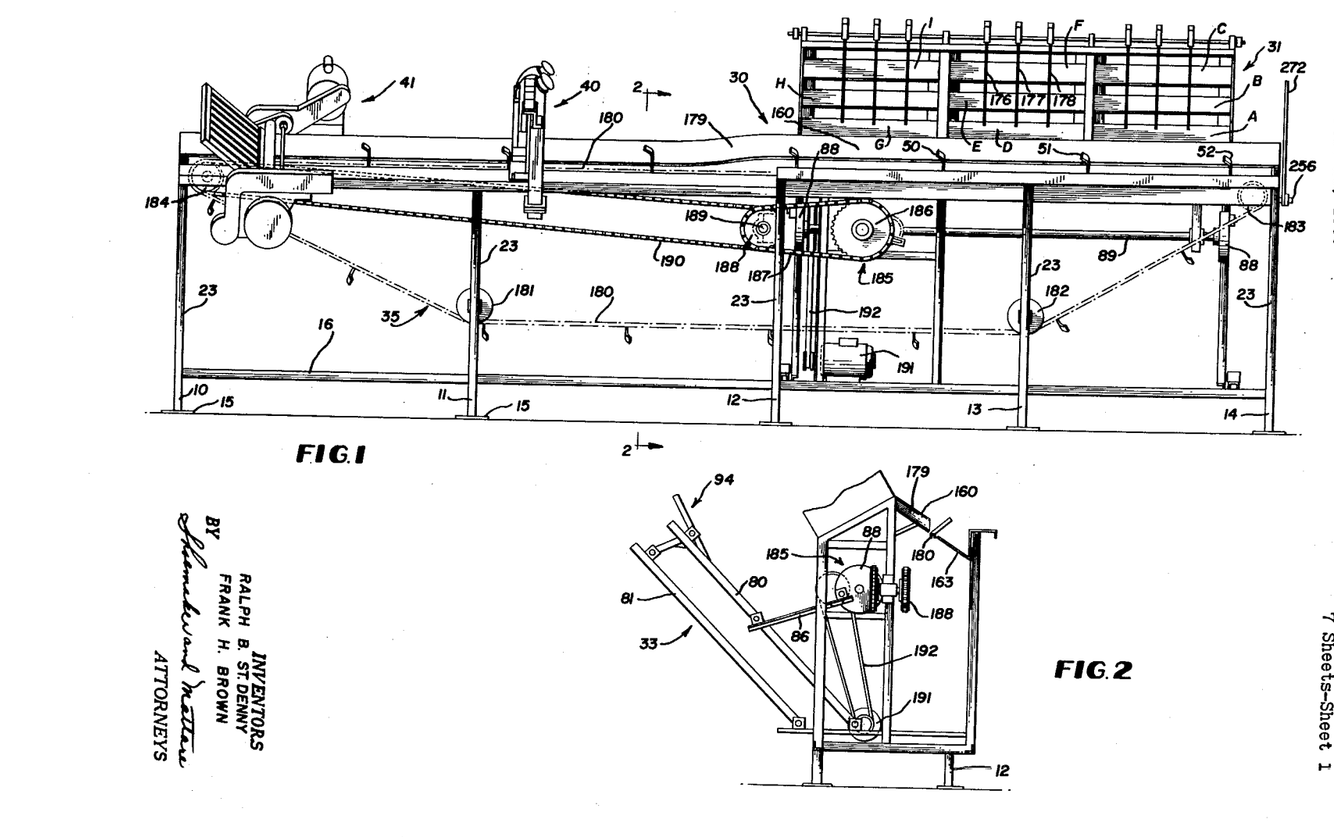
FIG. 1 is a front elevational view of the machine illustrating the relative disposition of the sheet receiving bins and the conveying mechanism and, as well, showing associated with the conveying platform a stitching or stapling station and a folding station which may be utilized in conjunction with the collating machine.
FIG. 2 is a vertical section taken substantially along the plane of section line 2—2 in FIG. 1 and illustrating details of the platform or conveying table as well as the relative disposition of certain of the components of the drive mechanism and of the dispensing means.

Referring at this time more particularly to FIG. 1, the collating machine is shown in its entirety therein. The machine proper includes a frame for supporting the various component parts and elements thereof. Such frame, for purposes of economy and reduction in weight, is preferably formed generally in the manner illustrated in FIG. 1 and is of skeletal form. Such frame may include a plurality of uprights 10, 11, 12, 13 and 14 provided with plate-like feet 15 at their lower extremities to distribute the load and by means of which the machine may be readily anchored or otherwise fixedly secured to a supporting floor. Extending the length of the frame along the front thereof is a horizontal stringer 16 which serves to interconnect all of the uprights 10–14 illustrated in FIG. 1.

Figure 3:
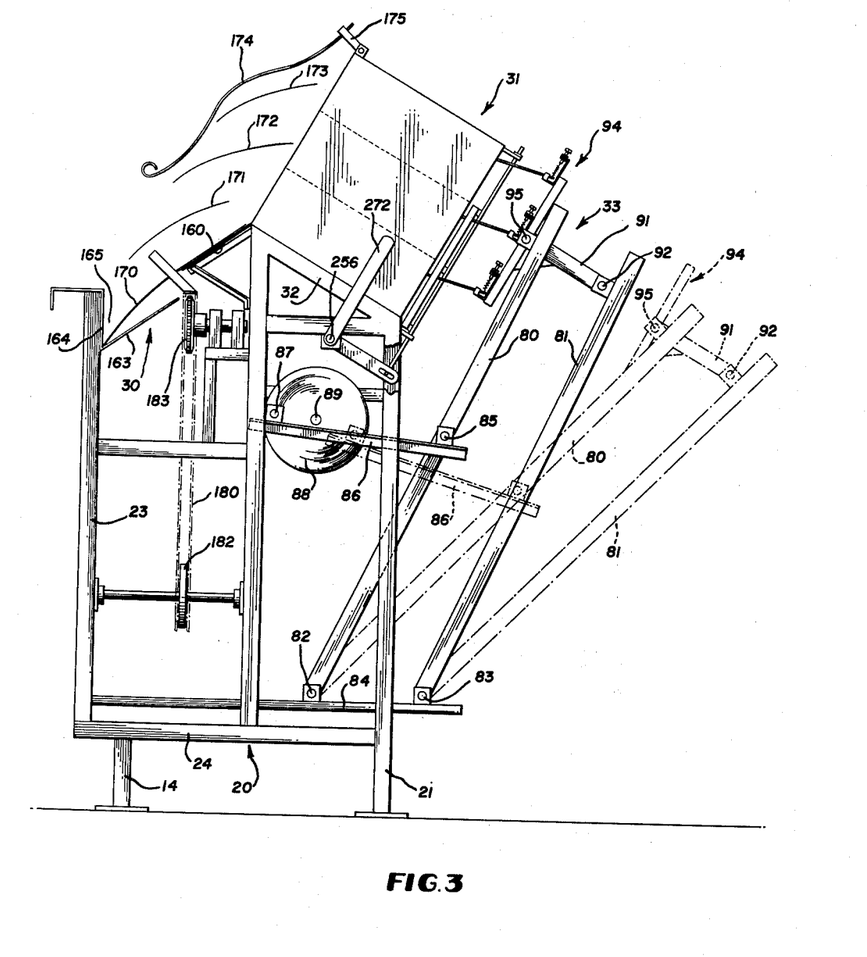
FIG. 3 is an end elevational view of the machine showing the dispensing arms in their two extreme positions and illustrating the disposition of the bins and the manner in which the sheets fly therefrom for ultimate disposition upon the conveying platform or table.

As can be best seen in FIG. 3, the uprights 10–14 which are at the front of the machine are of relatively short vertical extent and serve to support the main frame assembly indicated generally by the reference character 20. Each of the front uprights 10–14 has its rear counterpart such as the upright 21 illustrated in FIG. 3 corresponding to the upright 14 which extends vertically upwardly towards the upper region of the machine and at the rear thereof. The counterpart for the upright 12 is indicated by the reference character 22 in FIG. 4.

The main frame assembly 20 is formed at the rear side thereof with the upper and main extent of the uprights, such as those described and indicated by reference characters 21 and 22, by the front vertical members 23 and by the horizontally disposed frame members 24 which project rearwardly from the elements 23, see particularly FIG. 3.

Along the front edge of the frame is supported a conveying platform or table assembly indicated generally by the reference character 30, the construction of which will be described in greater detail hereinafter. Rearwardly of the table and disposed generally thereabove is the bin assembly indicated generally by the reference character 31, the detailed description of which will also follow. The bin assembly is mounted on a rearwardly sloping upper portion of the frame assemblage as indicated by the reference character 32 in FIGS. 3 and 4 so that, as shown, the bin assembly is tilted rearwardly. The purpose of this is to retain the stacks of individual sheets within the bins of the bin assembly and prevent accidental removal of the sheets from the several bins, as will be hereinafter more clearly pointed out.

Figure 4:
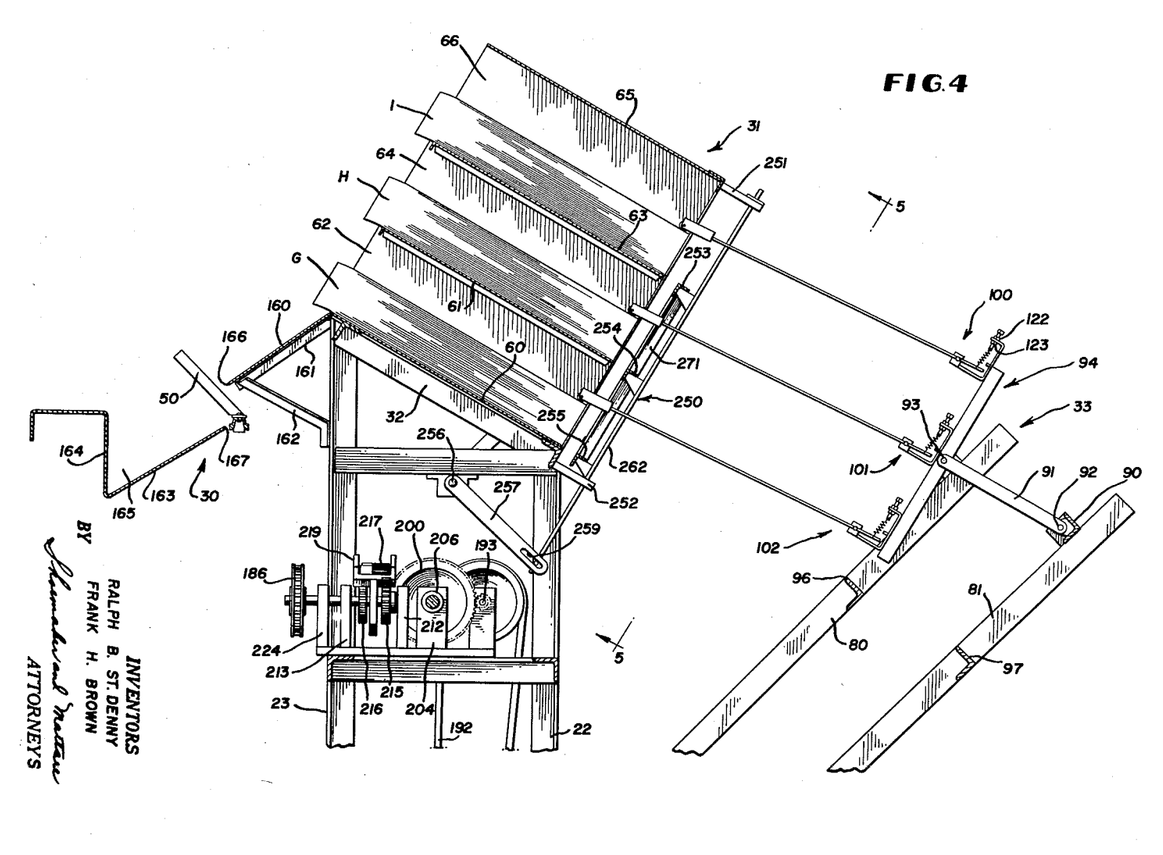
FIG. 4 is an enlarged vertical section taken through the machine illustrating further details of the drive mechanism as well as details of the bins, the conveying platform and the dispensing means.

Mounted at the rear of the machine is a dispensing assembly or means indicated generally by the reference character 33, see particularly FIGS. 3 and 4, which cooperates with the bins for dispensing individual sheets from the stack disposed in each bin in such fashion as to properly relate these sheets for disposition upon the table or platform 30.

In FIG. 1, reference character 35 indicates generally an endless chain conveyor mechanism which cooperates with the table 30, as hereinafter described, to convey the stacks from station to station along the table or platform 30 to eventually provide a properly collated stack of individual sheets which may then be progressed along the platform or table 30 for operation thereupon by a stitching or stapling mechanism indicated generally by the reference character 40, the details of which form no part of this invention but the same being shown diagrammatically in FIG. 1. Also shown in FIG. 1 is a folding assembly indicated generally by the reference character 41, the details of which also form no part of this invention but which folder may be desired to be utilized with the machine. Briefly, the operation of the machine is such that in accordance with the showing in FIG. 1, nine sheets of printed paper may be collated. The bin assembly 31 contains nine separate bins disposed in tiers of three and each tier of three being disposed next adjacent to a similar tier. Each bin contains a stack of printed sheets. Each bin is open at the front side of the machine and the stacks in the individual bins are indicated generally by the reference characters A, B, C, D, E, F, G, H and I. The stacks of sheets A, B and C are disposed in the first tier of bins, the stacks D, E and F are disposed in the second tier and the stacks G, H and I are disposed in the third tier. Obviously, the invention is not to be limited to three bins in a tier, nor in three individual tiers. There may be any desired number of adjacent tiers to accommodate for as many sheets as is desired and each individual tier may contain more or less than three bins, in accordance with the desired size of the machine and the number of sheets which it is capable of collating.

The conveying chain 35 has secured thereto, at spaced points therealong, conveying fingers such as those indicated by the reference characters 50, 51 and 52, for example, in FIG. 1. The operation of the chain 35 is intermittent so that the fingers periodically pause substantially in the positions shown in FIG. 1 and at this time, the dispensing mechanism or means is operative to dispense the sheets from the tiers simultaneously for disposition upon the table or platform 30. Then the conveying means is continued in this operation to move the fingers 50, 51 and 52 to the left in FIG. 1 and then the conveying mechanism pauses again, at which point the finger 52 has been disposed in the position formerly occupied by the finger 51, the finger 51 is disposed in the position formerly occupied by the finger 50, and so on and so forth so that the stack originating at the tier containing the sheets A, B and C is disposed to next receive the sheets D, E and F and then to finally receive the sheets G, H and I. After the collated stack of sheets, containing nine individual sheets A through I, are formed, they are passed to the stapling mechanism 40 and then to a folding mechanism 41, although it is to be understood that the stapler and the folder may be omitted, if desired. However, it would be more common to have sheets A through I forming actually two separate pages which are stapled down their middle between the individual integral pages and then folded along this line of stapling or securement into booklet or pamphlet form. In this fashion, the underside of each A sheet would form the front and back covers for the pamphlet or booklet, the underside of the B sheet in each case would form the first and last printed pages of the booklet or pamphlet, exclusive of any material appearing on the inner sides of the front and back covers which would be printed upon the upper sides of the A sheets and so on and so forth until the I sheet which would form the innermost sheet of the pamphlet or booklet. It will be understood that the sheets A through I may be printed on either or both sides and they may or may not be folded and secured as above described. For example, they may contain printing only on one side and it may be desirable that the collated stack in each case be merely just that, a loose stack of properly collated individual sheets which are not secured together. In such case, the stitching and folding stations would be eliminated or rendered inoperative.

FIG. 4 illustrates the construction of the bins and in this figure, one tier of such bins is shown. The lowermost bin is provided between the bottom wall 60 and the shelf 61 and the front of this bin is open as indicated by the reference character 62. The next highest bin of the tier is provided between the shelf 61 and a further shelf 63, this bin also being open at the front as indicated by the reference character 64. The uppermost bin of the tier is disposed above the shelf 63 and there may be provided a top wall 65 for the tier assembly, the open front of this bin being indicated by the reference character 66. As previously described, each tier of bins is tilted backwardly so that the open fronts thereof are pointed upwardly somewhat to better serve to retain the stacks of paper therewithin. The rear side of each tier of bins is provided with a vertical plate 70, see particularly FIG. 5, with each such vertical plate overlapping into the regions of the adjacent bins as seen in the drawings. The bins at the ends of the assemblage are provided with plates 71. That is to say, the plates 70 are common to adjacent tiers of bins while the end plates 71 serve only for their respective end tiers. The spacing between any two opposed edges, such as the edges 72 and 73 of the plates for each tier of bins is less than the width of the sheets of paper in the stacks such that the plates form back stops to hold the stacks of sheets in position within the bins and in properly stacked relationship therewithin. As seen in FIG. 4, it is preferred that the depth of the bins is somewhat less than the length of the sheets of the stacks, such as those indicated by the reference characters G, H and I in this figure, the purpose of this being presently apparent.

The dispensing assemblage 33 includes an oscillatory framework including spaced pairs of side members 80 and 81, the lower extremities of each pair being pivoted as at 82 and 83 upon a suitable support member 84 rigid with the frame. The forward side member 80 of each pair is pivotally connected as at 85 to a forwardly extending link 86 having a pivotal connection at 87 at its forward end to a wheel 88 rigid with shaft 89, the shaft being journalled on the frame as hereinafter more fully described. Needless to say, rotation of the shaft 89 will effect oscillatory motion to the member 80 between the full and dotted line positions illustrated in FIG. 3.

The two members 81 are interconnected by a rigid cross bar 90 and spaced at both ends of this cross bar are two forwardly projecting links 91 pivoted to the bar as at 92. These links are rigidly connected at their forward extremities by fasteners 93 to a generally rectangular, elongate skeletal frame indicated generally by the reference character 94 and which frame extends generally between the members 80 and being pivotally connected thereto at its opposite ends by means of trunnions 95. These trunnions 95 are received in pillow or bearing blocks 95' fixed to the respective members 80.

To further rigidify the members 80 and 81, there may be provided horizontal stringers 96 and 97 extending therebetween, see particularly FIG. 4. It will be appreciated that by this arrangement, oscillation of the members 80 and 81 will correspondingly oscillate the frame 94. Side members 80 and 81, by spacing on support members 84 and links 91 are arranged parallel to each other. Also links 91 and members 84 are arranged parallel to each other, or closely thereto by the pivotal points 82, 83, 92 and 95 on side members 80 and 81. Thus link 91 is constrained to move in a parallelogram motion relative to the frame and hence frame 94 which is rigidly connected to 91 by fastener 93 is also constrained to move in parallelogram motion to the frame. Therefore frame 94 maintains a constant angular relation to bin assembly 31 which is attached to the frame. This constant angular relationship of frame 94 to bin 31 may be adjusted by changing pivotal points 83 and 92 so as to control the position of the dispensing means in relationship to the paper stacks.

Figures 5, 6, 7, 8:
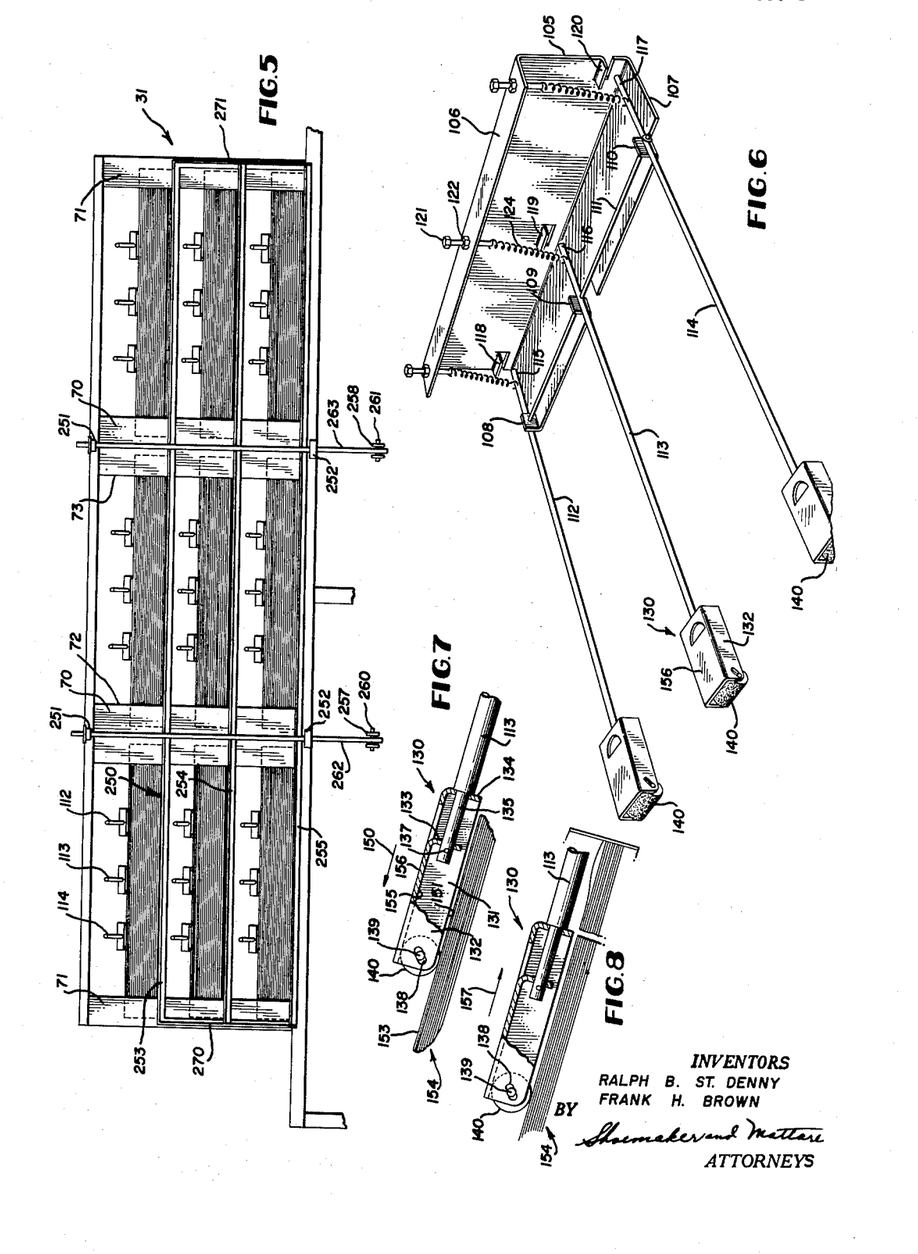
FIG. 5 is a vertical section taken substantially along the plane of section line 5—5 in FIG. 4 illustrating further the disposition of the bins and also illustrating the means associated with the dispensing means for moving them to inoperative position for the purpose of replacing or adding sheets to the individual bins.
FIG. 6 is a perspective view of the arm assembly of one of the dispensing means.
FIG. 7 is an enlarged view showing one of the dispensing arm assemblies in operative position during a dispensing movement and illustrating the braking action on the roller.
FIG. 8 is a view similar to FIG. 7 but illustrating the return motion of the dispensing arm and illustrating the manner in which the predetermined drag effected thereby is operative to straighten the stack and cause the top sheet to be separated from the remainder of the paper stack thereby breaking any bond between the sheets caused by static or sticky ink.

The frame assembly 94 carries a plurality of dispensing finger mechanisms. There is a dispensing finger mechanism provided for association with each bin and, consequently these mechanisms are arranged in vertical stacks of three such as those indicated generally by the reference characters 100, 101 and 102 in FIG. 4. Each such mechanism can be best seen from FIG. 6 wherein one of such mechanisms is shown. In FIG. 6, it will be seen that each dispensing finger assembly includes a base portion having an upstanding plate portion 105 provided along its upper edge with a forwardly projecting flange 106 and along its lower edge with a forwardly projecting flange 107. Along the front edge of the lower flange 107, there are provided a plurality of upstanding bracket tabs 108, 109 and 110 which, as shown, are struck out from the flange 107 proper. A horizontally extending rod 111 is journalled in these tabs, the opposite ends of the rod which extend beyond the respective tabs 108 and 110 being provided with cotter pins or the like to retain the rod properly in relation with the tabs. Forwardly projecting arms 112, 113 and 114 are carried by the rod 111 and the rearward extremities 115, 116 and 117 of these rods are disposed in close proximity to but out of contact with the vertical member 105. To limit angular movement of the arms 112—114, the member 105 has outwardly struck tongues 118, 119 and 120, substantially as shown, which overhang the ends 115—117 of the arms and will serve as abutments therefor to limit the angular movement of the arms relative to the mounting base therefor. The top flange 106 serves as a mounting means for the tension adjustment mechanism which, in each case, includes a threaded bolt 121 projecting through the flange 106, which flange is sandwiched between a pair of nut members 122 and 123, see particularly FIG. 4. The lower end of each of the bolts 121 is connected to a tension spring element 124 and the lower end of this tension spring is connected to a corresponding end 115, 116 or 117 of the several arms 112—114. Thus, it will be seen that the dispensing finger or arm assemblies are integral and separate units which are affixed to the frame 94 at such locations thereon as to project through the open backs of the individual bins for cooperation with the sheets disposed therein to effect the dispensing, as will be presently apparent.

The forward end of each of the arms 112—114 carries a friction roller assembly such as that indicated generally by the reference character 130 in FIG. 6. Each such assembly 130 is preferably constructed from a flat sheet of metal with opposite sides 131 and 132 thereof downturned, with a downwardly struck tongue 133 being disposed intermediate the opposite ends and with there being provided a downwardly struck rear wall 134. The forward extremity of each arm 112—114 is of reduced diameter, as indicated by the reference character 135 in FIG. 7, for example, and this reduced diameter portion projects through the wall 134 and the tongue 133 and is provided with some means for preventing withdrawal of the arm, such as a cotter pin 137. In this fashion, each assembly 130 is free to rotatively align itself on the arm in a manner hereinafter set forth.

The forward extremities of the walls 131 and 132 are provided with downwardly and forwardly angulated elongate slots 138 which receive stub shafts 139 projecting axially from the opposite ends of a roller 140 disposed between the side walls 131 and 132. Preferably, the rollers 140 are rubber surfaced for good frictional grip with the individual sheets of paper in the stacks in the bins.

FIGS. 7 and 8 illustrate the purpose of this mounting for the rollers 140. In FIG. 7, the arm 113 is being moved forwardly in the direction of the arrow 150 with the roller 140 which projects below the lower edges 151 of the side walls 131 and 132 in contact with the uppermost sheet 153 of the paper stack 154. The periphery of the roller 140, due to the direction of movement of the arm 113, engages the undersurface 155 of the top 156 and is thereby prevented from rotating and the sheet 153 is, therefore, effectively moved along with the assembly 130 in a dispensing direction. Upon rearward movement of the arm 113, as indicated by the arrow 157 in FIG. 8, it will be appreciated that the tension mechanism will be sufficiently forceful to prevent the roller from freely rotating, that is riding down in the elongate slots. This produces a predetermined drag on the top sheet as the arm is moved in retrograde fashion, causing the top sheet to be positioned against the back stop of the bin and assuring separation of the top sheet from the remainder of the paper stack.

Referring at this time more particularly to FIGS. 3 and 4, it will be seen that the table or platform assembly includes an upper shelf 160 which is downwardly and forwardly angulated and is attached to the upper extremity of the frame along the lower edges of the bins as shown, and is provided with suitable supporting members 161 and 162 to rigidly support the shelf on the frame. The platform includes a lower shelf 163 which is disposed forwardly of the upper shelf 160 and at a lower level, as shown, with the lower shelf 160 joining along its lower edge with a vertical member 164 so that the shelf 163 and the member 164 form a crotch 165 therebetween which is adapted to receive the edges of the dispensed sheets as they are ejected from the bins. The lower edge 166 of the upper shelf 160 and the upper edge 167 of the lower shelf 163 are disposed in substantial vertical alignment but in spaced relationship to each other with the fingers of the conveying assembly projecting angularly therebetween as is best shown in FIG. 4 wherein one such finger 50 is shown.

The two shelves 160 and 163 are vertically staggered, as shown, for the reason that this disposition of the shelves arches the sheets as they are dispensed onto the table assembly 30, one such sheet in arched condition being illustrated by the reference character 170 in FIG. 3. FIG. 3 also illustrates the manner in which the individual sheets fall from the bins as they are dispensed therefrom. Three such sheets are indicated in FIG. 3 by the reference characters 171, 172 and 173. As will be noted, the sheets are dispensed substantially simultaneously and fall therefrom to be received within the crotch 165 and thus disposed in vertically stacked relationship. To aid in directing the sheets towards the crotch 165 and assuring that they are properly received on the table 30, there may be provided thin strip-like fingers 174 secured at their upper ends by means of suitable brackets 175 to the uppermost region of the bin assembly 31 and which extend angularly downwardly therefrom in the manner best illustrated in FIG. 3. Several such guide members may be provided for each bin assembly, such as the fingers 176, 177 and 178 as, for example, shown in FIG. 1.

As is also shown in FIG. 1, the upper shelf 160 beyond the bin assembly 31 is sloped downwardly in the region 179 to present a region 180 therebeyond which is substantially coplanar with the lower shelf since the offset relationship of the two shelves is not necessary once the stacks have been accumulated.

The conveying mechanism 35 is, as hereinbefore described, comprised of an endless chain 180 having the conveying fingers rigidly affixed thereto, it being appreciated that the spacing between adjacent fingers is such as to permit the sheets from the bins to be disposed therebetween and in order to provide ample clearance for this relationship, the bins are spaced apart slightly in a horizontal direction so that the adjacent stacks in the bins are not right next to each other but with there being some space between these stacks and it is in alignment with this spacing between the stacks that the fingers are caused to pause in the their conveying movement.

The chain 180 is trained about a series of sprockets 181, 182, 183 and 184 rotatably supported by the frame of the machine and, if desired and necessary, further sprockets or rollers may be provided for supporting the horizontal flight of the chain which actually produces the conveying action on the stacks of sheets. The drive assembly for the conveyor means and, as well as for the dispensing means, is indicated generally by the reference character 185 and is mounted upon a suitable portion of the frame of the machine. This drive, as hereinafter described, is of the plural power output type, one output going to the drive for the dispensing means and the other output going to the conveyor means. The power path to the conveying means is from the pulley 186 by means of a belt 187 to an intermediate pulley 188 fixed to a shaft 189 suitably journalled on the machine and thence from this shaft 189 to a further pulley rigid with shaft 189 and from such pulley through belt 190 to a pulley rigid with the shaft upon which the sprocket 184 is mounted. The drive to the power train 185 is from an electric motor 191 through belt 192 to the input of the power train 185, as hereinafter described.

Figure 9:
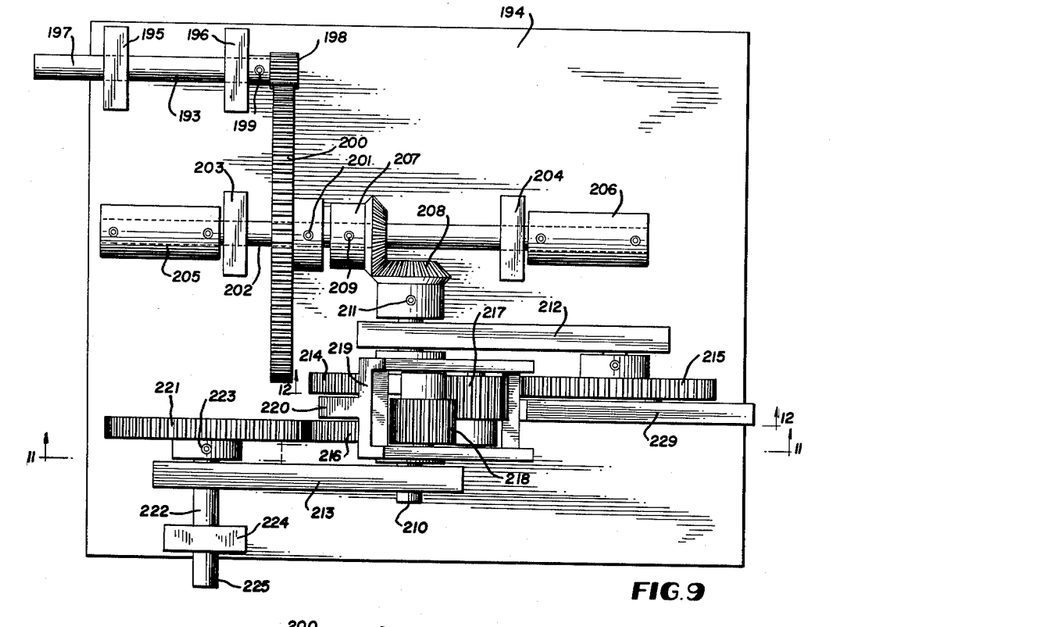
FIG. 9 is a plan view of the drive mechanism.

Concerning the details of the drive assembly, reference is had now more particularly to FIG. 9. In this figure, a plan view of the drive train assembly 185 is shown. The input for the drive train comprises the input shaft 193 which is journalled on the base 194 by means of suitable bearings 195 and 196. It is appreciated that this shaft 193 is provided with a pulley on the end portion 197 which is drivingly connected to the motor 191 through the previously mentioned belt 192 but which connection is not shown in this figure for the purpose of clarity. The opposite end of shaft 193 has a pinion 198 rigidly affixed thereto as by set screw 199, this pinion being engaged with the main drive gear 200 feathered or otherwise suitably secured such as by set screw 201 to intermediate shaft 202. This shaft 202 is also journalled on the base 194 by means of suitable bearings 203 and 204. The opposite ends of shaft 202 are preferably provided with detachable coupling elements 205 and 206 by means of which the opposite ends of the shaft 202 are coupled to the eccentric wheels 88 for driving the dispensing mechanism. Thus, it will be seen that the drive to the eccentrics for the dispensing means is continuous and uninterrupted so long as the motor 191 is operating. The output from shaft 202 to the eccentrics constitutes one power path of the gear train assembly 185.

The other power path is branched from the shaft 202 through the mating bevel gears 207 and 208 fixed respectively to the shaft 202, as by set screw 209 and to the shaft 210 as by the set screw 211. The shaft 210 is an idler shaft and is journalled between two upstanding plate members 212 and 213 rigid with the base 194. Between the plates 212 and 213 and rigid with the shaft 210 is a control gear 214 which is in mesh with an idler gear 215 fixed to a stub shaft journalled within the plate 212, the purpose of the idler gear 215 being presently apparent.

An output gear 216 is journalled on shaft 210 and receives its drive from the control gear 214 through the medium of the epicyclic gears 217 and 218. The epicyclic gears are carried by a yoke assembly 219 which has a stem portion 220 disposed between gears 214 and 216 and journalled on the shaft 210. The epicyclic gear 217 is in mesh with the control gear 214 and the epicyclic gear 218 is in mesh with the output gear 216 and these gears are overlapped, as shown, so that they are in mesh with each other.

The output gear 216 is in mesh with the power gear 221 which is fixed to shaft 222 as by set screw 223, such shaft being journalled both in the plate 213 and in a suitable outboard bearing 224. The outer free end 225 of this shaft receives the previously mentioned pulley 186 which initates the drive to the conveying belt.

Figure 10:
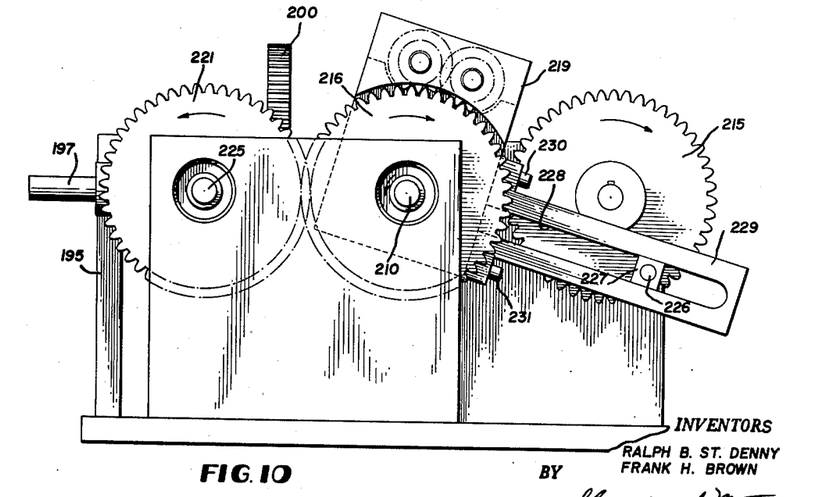
FIG. 10 is a front elevation of the drive mechanism.
Figures 11, 12, 13:
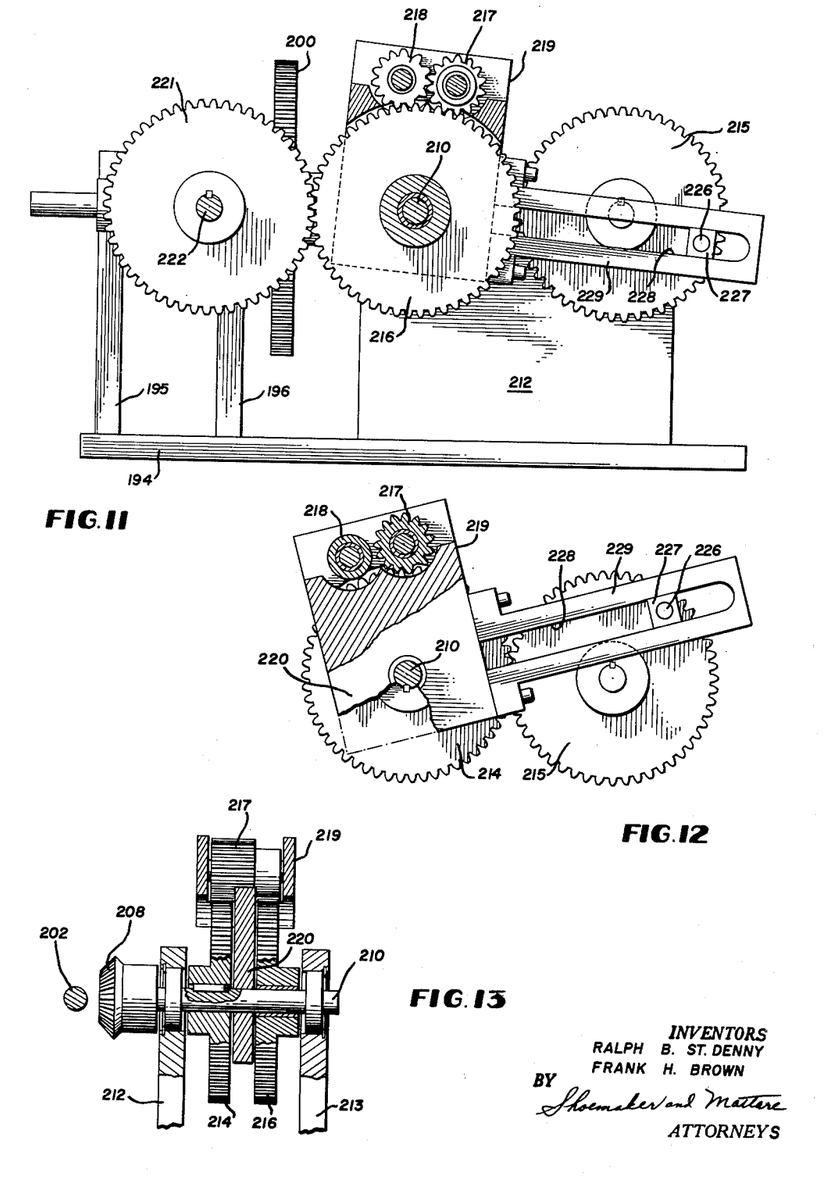
FIG. 11 is a vertical section through the drive mechanism taken generally along the plane of section line 11—11 in FIG. 9.
FIG. 12 is a view partly elevational and partly sectional on line 12—12 of FIG. 9, illustrating the manner in which the planetary gears are controlled.
FIG. 13 is a transverse section taken substantially along the plane of section line 13—13 of FIG. 12.

As previously stated, the motion of the shaft 222 and consequently of the conveyor chain is of a continuously varying character, with there being predetermined timed pauses in such drive. This is effected by virtue of the epicyclic connection between gears 214 and 216 by effecting an oscillation of the carrier or yoke 219. This oscillation of the yoke or carrier 219 is effected through the medium of the idler gear 215. As shown in FIG. 10, the idler gear 215 is provided with an eccentrically disposed and laterally outwardly projecting stub axle 226 upon which is journalled a guide block 227 which is captive within an elongate slot 228 in the control arm 229. The control arm is secured at one end thereof to the yoke or carrier 219 and this securement may be effected by detachable means such as the fasteners 230 and 231. From FIG. 10, it will be evident that rotation of the idler gear 215 will effect oscillation of the yoke 219 about the axis of shaft 210 upon which the yoke is journalled.

Taking into consideration the fact that the rotation of shaft 222 in FIG. 10 is counterclockwise, it will be appreciated that shaft 210 also must be rotating in a counterclockwise direction and the gear 215 is rotating in a clockwise direction. Gear 217 will be rotating also in a clockwise direction and gear 218 will be rotating in a counterclockwise direction to tend to impart clockwise rotation to the gear 216. Thus, downward movement of the arm 229 rotating the carrier or yoke 219 clockwise about the shaft 210 will accelerate the motion of gear 216 and consequently the output shaft 222. Conversely, upward movement of arm 229 oscillating the yoke or carrier 219 in a counterclockwise direction will tend to cancel the clockwise motion of gear 216 and if the angular velocity of movement of the yoke or carrier 219 is great enough, the gear 216 will be caused to stop rotating momentarily which will interrupt drive to the shaft 222. Actually, the motion which is transmitted to the shaft 222 is constantly varying in angular velocity. When the eccentric stub shaft 226 is in an uppermost position just ready to start the arm 229 in a downward direction, there will be an acceleration of the angular velocity of shaft 222 which will reach a maximum 90° of rotation of gear 215 from the aforementioned starting position and then there will be a deceleration to a point 270° from the starting position, at which time the motion of shaft 222 will be stopped momentarily and then during the last 90° of rotation of the gear 215, in one revolution thereof, there once more will be an acceleration from zero velocity back to the starting point velocity. In other words, for 180° of motion of gear 215, there is a constantly accelerated angular velocity of shaft 222 starting from zero velocity and then during the second 180° of rotation of gear 215, there is a deceleration of angular velocity of shaft 222 terminating back at the origin once again at zero velocity.

When the machine is started, the bins will be partially filled with the appropriate stacks of individual printed sheets and in proper sequential order for obtaining the correct disposition of the stacks of sheets fed from the machine. To facilitate handling of the stacks of sheets to be disposed in the bins, special trays may be provided, not shown, which are simply pieces of sheet metal having opposite sides thereof bent upwardly to form trays open at the front and back and the stacks of individual sheets may be fed into the bins disposed in such trays. Naturally, some means is preferred to be provided for elevating the dispensing arms when a fresh stack of sheets is to be disposed in any one or a plurality of the bins and for this purpose, the manual mechanism illustrated best in FIGS. 4 and 5 is provided. Basically, such manual mechanism comprises a rack 250 which is mounted by means of suitable brackets such as 251 and 252 at the rear of the bin assembly 31 for vertical reciprocation. Such rack carries a plurality of horizontal abutment members 253, 254 and 255 which extend below respective sets of arms of the dispensing members and upon vertically upwardly disposed motion of the rack 250, the individual arms will be lifted out of contact with the stacks of sheets. For this purpose, a crank shaft 256 is rotatably supported by the frame and is provided with crank arms 257 and 258, see particularly FIG. 5, which crank arms are rigid with the crank shaft 256 and which are provided with bifurcated free ends having elongate slots 259 therein. These slots receive pins 260 and 261 carried by the lower ends of vertical rods 262 and 263 which are the rods received in the aforementioned brackets 251 and 252. These rods 262 and 263 are rigid with the rack frame 250. The opposite extremities of the horizontal bars or members 253, 254, and 255 are interconnected by uprights 270 and 271 forming a rigid framework for movement of the several horizontal members 253—255 in unison.

The crank shaft 256 extends to one end of the machine, see particularly FIG. 3, and is provided thereat with an upstanding handle 272 which is rigid with the crank shaft and which is disposed for manual operation so as to manually reciprocate the rack 250 and achieve the lifting of the dispensing arms or fingers.

Reviewing the operation of the device, it will be appreciated that the reciprocation of the dispensing means is timed with relationship to the motion of the conveying means, this being accomplished by positioning the gear 215 of the drive train 185 so that when the sheets are dispensed by the dispensing fingers, the conveying chain and consequently the conveying fingers carried thereby will be stationary, permitting the sheets of the tiered bins to fall one on top of the other into a sub-stack. Commencing with the first tier of bins, the only sheets on the table will be the sheets from the first tier of bins and then subsequent movement of the conveying means effects return motion of the dispensing means and then the initiation of the forward or dispensing motion thereof until such point as the dispensing operation takes place, at which time the conveying fingers will again be stationary and the next stack of sheets from the next tier of bins will be disposed in stacked relationship to those sheets stacked at the previous tier and so on until the stacks are built up to their ultimate number of sheets at the end of the dispensing portion of the machine. Obviously, the conveying fingers engage one side edge of the stacked sheets and serve to align these edges. However, in order to assure an accurate alignment of the opposite side edges of the sheets of the stack, a jogger assembly, as shown in FIG. 14, is preferably provided.

Figures 14, 15, 16:
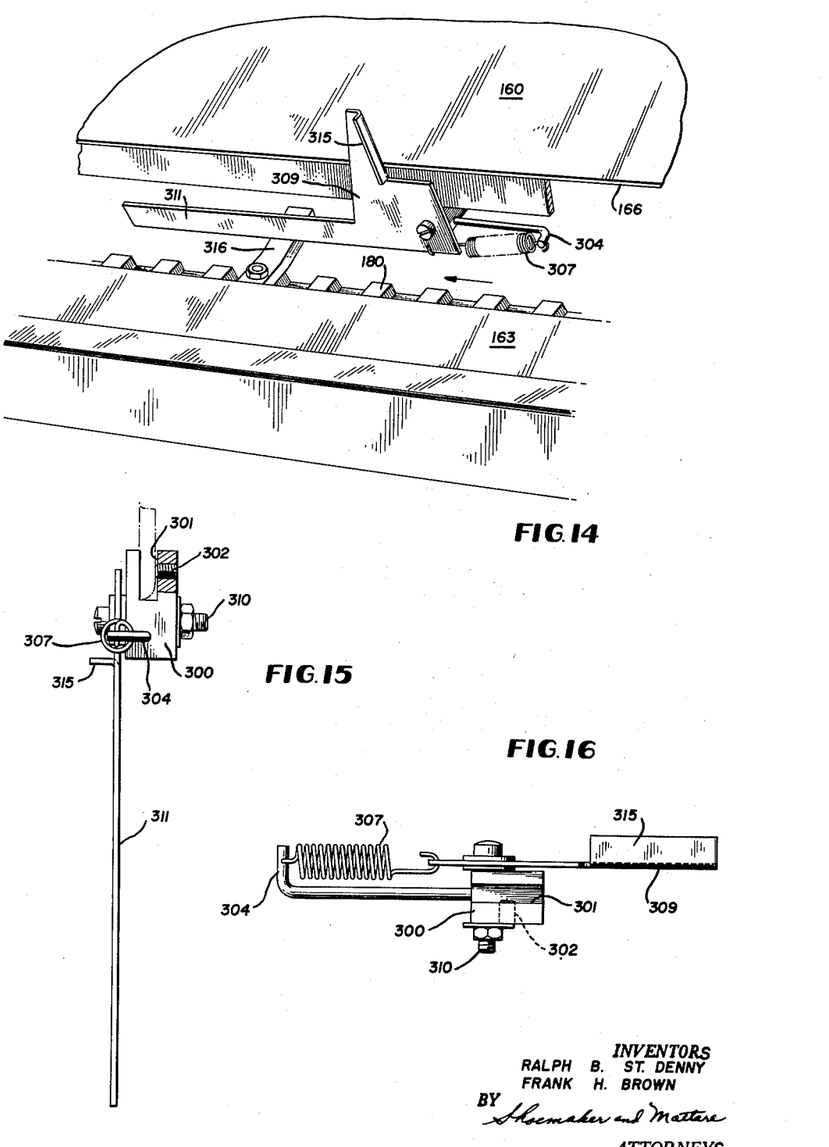
FIG. 14 is a perspective view showing the jogger assembly.
FIG. 15 is an end view of the jogger assembly.
FIG. 16 is a top plan view of the jogger assembly.

As shown in FIGS. 14–16, the jogger assembly includes a mounting base 300 having a slot 301 adapted to fit over a suitable machine frame element whereby such base 300 is rigidly affixed to the machine as by means of a set screw 302. An outrigger arm 303 is rigidly affixed to the mounting base 300 and terminates in a laterally bent end portion 304 provided with a transverse bore receiving one end 305 of a tension spring 306. The opposite end 307 of the tension spring passes through a suitable aperture in the ear 308 of the jogger plate 309. The mounting base 300 carries a transverse pivot member 310 which journals the jogger plate 309 thereon. The jogger plate includes a depending arm portion 311 and a normally horizontally disposed striker arm 312. The upper edge of striker arm 312 is provided with a flanged edge 315 adapted to engage the stacked sheets. The conveyor chain is provided at suitably spaced points along its length with abutment arms 316. When one of the abutment arms 316 engages the depending leg or arm 311 of the jogger, the jogger will be rotated clockwise through an arc of approximately 90°, ultimately disposing the upper edge 315 of the striker arm 312 against the edge of the sheets of a conveyed stack opposite to that edge engaged by the conveying finger associated therewith so as to straighten the stack and assure positive alignment of the opposite side edges of the sheet comprising such stack. The tension spring 306 is, of course, elongated during this 90° motion of the jogger plate and as soon as the abutment means on the chain has passed the depending arm 311, the jogger plate will be spring returned to its normal position.

An important feature of the invention is the manner in which the dispensing means operates, particularly as regards that portion of the dispensing means which actually engages the sheets of paper. It will be understood that the present machine is capable of operating upon relatively thick sheets as well as relatively thin sheets, the tensioning means for the dispensing arms being capable of adjustment to accommodate for the weight or thickness of the paper upon which the machine is operating.

As previously pointed out, the rollers on the dispensing members which actually engage the paper are not intended to rotate in their forward movement. Due to the inclination on the slots, there is a positive locking or braking action as the dispensing members are moved forwardly in a dispensing direction. During retrograde movement, the tensioning of the arms is sufficient to prevent the rollers from completely disengaging from the braking surface provided by the undersurface of the top members. It will be obvious that by controlling the tension of the dispensing mechanism in the retrograde movement, the top-most sheet is caused to separate from the paper stack. By accurately controlling the separation, which is caused by the sheeting buckling against the back stop of the bins, any tendency of the sheets to stick together because of static or sticky ink, is eliminated. It will be appreciated that the stack, particularly adjacent the top thereof, may tend to creep, as shown. During retrograde motion of the dispensing means, by providing the proper tension so that the rollers do not rotate freely, a predetermined drag will be produced directly upon the uppermost sheet, that is the next sheet to be dispensed, positively assuring that this sheet will be engaged against the back stop of the bin. Ancillary thereto, the underlying sheets will be subjected to a returning motion also so as to prevent any substantial amount of creep of the uppermost sheets of the stacks such as might cause accidental displacement of a part of the stack during a dispensing movement. Naturally, the spring tension may well be varied in accordance with the weight of the paper sheets involved. With very thin sheets, relatively little tension is desirable since in no case is it intended that the tension on the dispensing arms be sufficient to wrinkle or crumble a sheet upon retrograde movement of the arms. With relatively heavy sheets, a substantially greater amount of tension may be desired to positively assure proper positioning and sufficient buckle of the uppermost sheet upon retrograde action of the dispensing arms.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:
1. A collating machine comprising a frame, an elongate longitudinally slotted table rigid with said frame, conveying means including a plurality of angularly disposed spaced fingers projecting angularly upwardly through the slot of said table for conveying stacks of paper sheets along said table, said table comprising two vertically staggered shelves separated by said slot, a plurality of tiers of bins disposed at an elevation above said table for receiving stacks of individual printed sheets, and means for intermittently feeding sheets from each of the individual bins simultaneously for disposition in a bowed condition upon said table.

2. A collating machine comprising a frame, an elongate longitudinally slotted table rigid with said frame, conveying means including a plurality of angularly disposed spaced fingers projecting angularly upwardly through the slot of said table for conveying stacks of paper sheets along said table, said table comprising two vertically staggered shelves separated by said slot, a plurality of tiers of bins disposed at an elevation above said table for receiving stacks of individual printed sheets, means for intermittently feeding sheets from each of the individual bins in each tier simultaneously for disposition upon said table, common means for driving the conveyor means and for dispensing sheets individually from said bins, said common drive means including one output path continuously driving said dispensing means and a second power output path of intermittent motion type driving said conveying means.

3. A collating machine comprising a frame having an elongate longitudinally slotted table thereon, said table comprising two vertically staggered shelves separated by said slot, a conveyor mechanism in the form of an endless chain mounted on said platform and having a horizontally disposed upper flight positioned just below one shelf of said table, said chain having a plurality of upstanding angularly disposed fingers thereon projecting through the slot of said table for conveying stacks of bowed sheets therealong, a plurality of tiers of bins superposed mounted on said frame at an elevation above said table and therebehind, said bins having open fronts, and means in each bin for periodically dispensing single sheets from each of said superposed bins of each tier simultaneously for disposition upon said table.

4. A collating machine comprising a frame having an elongate longitudinally slotted table thereon, said table comprising two vertically staggered shelves separated by said slot, a conveyor mechanism in the form of an endless chain mounted on said table and having a horizontally disposed upper flight positioned just below one shelf of said table, said chain having a plurality of upstanding angularly disposed fingers thereon projecting through the slot of said table for conveying stacks of bowed superposed sheets therealong, a plurality of tiers of bins mounted on said frame at an elevation above said table and therebehind, said bins having open fronts, means in each bin for periodically dispensing single sheets from each of said bins simultaneously for disposition upon said table, and common drive means for said conveying mechanism and for said dispensing means, said common drive means having one power output path continuously driving said dispensing means and a second power output path intermittently driving said conveyor chain.

5. A collating machine comprising a frame having an elongate longitudinally slotted table rigid therewith, said table comprising two verticaly staggered shelves separated by said slot, means for conveying stacks of arched sheets in step by step fashion along the length of said table, a plurality of adjacent tiers of superposed bins mounted in the upper region of said frame at an elevation above said table and therebehind, said bins having backwardly and downwardly angled shelves from the front of said machine and from said table and having open front and back sides, said shelves being adapted for receiving stacks of individual sheets lying flatwise thereon, a carriage mounted rearwardly of said bins for reciprocatory motion toward and from said bins and having forwardly projecting fingers carried thereby projecting through the open backs of said bins for engagement with the uppermost sheet of a stack of sheets in each bin and means for reciprocating said carriage to simultaneously dispense a single sheet from each bin into said slotted table.

6. A collating machine comprising a frame having an elongate longitudinally slotted table rigid therewith, said table comprising two vertically staggered shelves separated by said slot, means for conveying stacks of arched sheets in step by step fashion along the length of said slotted table, a plurality of adjacent tiers of superposed bins mounted in the upper region of said frame at an elevation above said table and therebehind, said bins having backwardly and downwardly angled shelves from the front of said machine and from said table and having open front and back sides, said shelves being adapted for receiving stacks of individual sheets lying flatwise thereon, a carriage mounted rearwardly of said bins and above said table for reciprocatory motion toward and from said bins and having forwardly projecting fingers carried thereby projecting through the open backs of said bins for engagement with the uppermost sheet of a stack of sheets in each bin and responsive to reciprocation of said carriage to simultaneously dispense a single sheet from each bin onto said table, and common drive means for the conveying means and dispensing means, said common drive means having one output path for continuously driving said dispensing means and a second power output path for intermittently operating said conveying means.

7. A collating machine comprising a frame having an elongated slotted table affixed thereto, said table comprising two vertically staggered shelves separated by said slot, said shelves serving to arch paper resting thereon, one of said shelves including a downwardly sloping portion merging with a vertically extending portion to define a sheet receiving crotch, a plurality of tiered bins affixed to said frame above and behind said table and each of such bins being adapted to receive a stack of individual sheets, said bins being angled rearwardly from the vertical to slope downwardly away from said table so as to retain the stacks of sheets in flat position therewithin, reciprocatory dispensing means engageable with the uppermost sheet of each of the stacks in said bins and movable to expel the uppermost sheet of each stack flatwise from the stack and from the fronts of said bins for deposition by gravity onto said portion of said table to be disposed with an edge in engagement with said vertical portion of the table within said crotch, means for conveying individual arched collated stacks of paper along said soltted table from one tier of bins to the next, and drive means for the conveying means for effecting intermittent step by step motion of the conveying means.

8. In a collating machine a frame having an elongate slotted table affixed thereto, said table comprising two vertically staggered shelves separated by said slot, said shelves serving to arch paper resting thereon, one of said shelves including a downwardly sloping portion merging with a vertically extending portion to define a sheet receiving crotch, a plurality of tiered bins affixed to said frame above and behind said table, each of such bins being adapted to receive a stack of individual sheets, said bins being angled rearwardly from the vertical to slope downwardly away from said table so as to retain the stacks of sheets in flat position therewithin, reciprocatory dispensing means engageable with the uppermost sheet of each of the stacks in said bins and movable to expel the uppermost sheet of each stack flatwise from the stack and from the fronts of said bins for deposition by gravity onto said portion of said table to be disposed with an edge in engagement with said vertical portion of the table within said crotch and the remaining portion of the sheet arched over said table, means for conveying individual collated arched stacks along said table from one tier of bins to the next, drive means for the conveying means for effecting intermittent step by step motion of the conveying means, and continuous drive means for said dispensing means timed in relationship with the drive means for the conveying means whereby the sheets are dispensed when the conveying means is stationary.

9. In a collating machine an upright frame having an elongate slotted table comprising two vertically staggered shelves separated by said slot affixed thereto, said table including a downwardly and forwardly sloping upper shelf and a downwardly and forwardly sloping lower shelf with the lower edge of said upper shelf and the upper edge of said lower shelf being disposed in vertically staggered relationship, a vertical wall portion extending along the lower edge of said lower shelf to form a crotch therewith whereby to effect retention of paper sheets therewithin in arched condition above the lower shelf, conveying means comprising an endless chain mounted on said frame and having an upper flight disposed along the underside of said table, a plurality of angularly disposed fingers fixed to said chain and projecting angularly upwardly therefrom between said slotted upper and lower shelves to engage the arched edges of stacks of sheets supported by the table and for moving the same along the length of said table.

10. In a collating machine an upright frame having an elongate slotted table comprising two vertically staggered shelves separated by said slot affixed thereto, said table including a downwardly and forwardly sloping upper shelf and a downwardly and forwardly sloping lower shelf with the lower edge of said upper shelf and the upper edge of said lower shelf being disposed in vertically staggered relationship, the shelves being in parallel planes, a vertical wall portion extending along the lower edge of said lower shelf to form a crotch therewith whereby to effect retention of paper sheets therewithin, in arched condition above the lower shelf, conveying means comprising an endless chain mounted on said frame and having an upper flight disposed along the underside of one shelf of said table, a plurality of angularly disposed fingers fixed to said chain and projecting angularly upwardly therefrom between said upper and lower shelves to engage the arched edges of stacks of sheets supported by the slotted table and for moving the same along the length of said table, and means for intermittently moving said chain.

11. In a collating machine an upright frame having an elongate slotted table comprising two vertically staggered shelves separated by said slot affixed thereto, said table including a downwardly and forwardly sloping upper shelf and a downwardly and forwardly sloping lower shelf with the lower edge of said upper shelf and the upper edge of said lower shelf being disposed in vertically staggered relationship, a vertical wall portion extending along the lower edge of said lower shelf to form a crotch therewith whereby to effect retention of paper sheets therewithin in arched condition above the lower shelf, conveying means comprising an endless chain mounted on said frame and having an upper flight disposed along the underside of one shelf of said table, a plurality of angularly disposed fingers fixed to said chain and projecting upwardly therefrom between said upper and lower shelves to engage the arched edges of stacks of sheets supported by the table and for moving the same along the length of said table, a plurality of tiers of bins disposed in side-by-side relationship serially along said frame above and behind said table, each bin being formed to receive sheets stacked flatwise one upon the other, means for periodically dispensing an individual sheet flatwise from each of said bins directly onto said table with the sheets dispensed from each tier being stacked in arched relationship onto the table.

12. In a collating machine an upright frame having an elongate slotted table comprising two vertically staggered shelves separated by said slot affixed thereto, said table including a downwardly and forwardly sloping upper shelf and a downwardly and forwardly sloping lower shelf with the lower edge of said upper shelf and the upper edge of said lower shelf being disposed in vertically spaced relationship, a vertical wall portion extending along the lower edge of said lower shelf to form a crotch therewith whereby to effect retention of paper sheets therewithin in arched condition above the lower shelf, conveying means comprising an endless chain mounted on said frame and having an upper flight disposed along the underside of one shelf of said table, a plurality of angularly disposed fingers fixed to said chain and projecting upwardly therefrom between said upper and lower shelves to engage the arched edges of stacks of sheets supported by the table and for moving the same along the length of said table, a plurality of tiers of bins disposed in side-by-side relationship serially along said frame above and behind said table, each bin being formed to receive sheets stacked flatwise one upon the other, means for periodically dispensing an individual sheet flatwise from each of said bins directly onto said table with the sheets dispensed from each tier being stacked onto the table in arched relationship, each tier of bins being angulated from the vertical rearwardly so as to slope downwardly away from said table to retain the individual sheet stacks in each bin.

13. In a collating machine an upright frame having an elongate slotted table comprising two vertically staggered shelves separated by said slot affixed thereto, said table including a downwardly and forwardly sloping upper shelf and a downwardly and forwardly sloping lower shelf with the lower edge of said upper shelf and the upper edge of said lower shelf being disposed in vertically staggered relationship, a vertical wall portion extending along the lower edge of said lower shelf to form a crotch therewith whereby to effect retention of paper sheets therewithin in arched condition above the lower shelf, conveying means comprising an endless chain mounted on said frame and having an upper flight disposed along the underside of one shelf of said table, a plurality of angularly disposed fingers fixed to said chain and projecting upwardly therefrom between said upper and lower shelves to engage the arched edges of stacks of sheets supported by the table and for moving the same along the length of said table, a plurality of tiers of bins disposed in side-by-side relationship serially along said frame above and behind said table, each bin being formed to receive sheets stacked flatwise one upon the other, means for periodically dispensing an individual sheet flatwise from each of said bins directly onto said table with the sheets dispensed from each tier being stacked onto the table in arched relationship, each tier of bins being angulated from the vertical rearwardly so as to slope downwardly away from said table to retain the individual sheet stacks in each bin, each bin being open at its forward end and having an opening at its rearward end, the means for dispensing the sheets projecting into said bins through the open rearward ends thereof.

14. In a collating machine an upright frame having an elongate slotted table comprising two vertically staggered shelves separated by said slot affixed thereto, said table including a downwardly and forwardly sloping upper shelf and a downwardly and forwardly sloping lower shelf with the lower edge of said upper shelf and the upper edge of said lower shelf being disposed in vertically staggered relationship, a vertical wall portion extending along the lower edge of said lower shelf to form a crotch therewith whereby to effect retention of paper sheets therewithin in arched condition above the lower shelf, conveying means comprising an endless chain mounted on said frame and having an upper flight disposed along the underside of one shelf of said table, a plurality of angularly disposed fingers fixed to said chain and projecting upwardly therefrom between said upper and lower shelves to engage the arched edges of stacks of sheets supported by the table and for moving the same along the length of said table, a plurality of tiers of bins disposed in side-by-side relationship serially along said frame above and behind said table, each bin being formed to receive sheets stacked flatwise one upon the other, means for periodically dispensing an individual sheet flatwise from each of said bins directly onto said table with the sheets dispensed from each tier being stacked onto the table, each tier of bins being angulated from the vertical rearwardly so as to slope downwardly away from said table to retain the individual sheet stacks in each bin, each bin being open at its forward end and having an opening at its rearward end, said dispensing means including a reciprocatory frame disposed behind said tiers of bins for movement toward and from the bins, individual fingers projecting from said reciprocatory frame and extending into corresponding bins through the open rearward ends thereof and said fingers including means on the forward free ends thereof for engaging and ejecting the uppermost sheet of a stack within each bin.

15. In a collating machine an upright frame having an elongate slotted table comprising two vertically staggered shelves separated by said slot affixed thereto, said table including a downwardly and forwardly sloping upper shelf and a downwardly and forwardly sloping lower shelf with the lower edge of said upper shelf and the upper edge of said lower shelf being disposed in vertically spaced relationship, a vertical wall portion extending along the lower edge of said lower shelf to form a crotch therewith whereby to effect retention of paper sheets therewithin in arched condition above the lower shelf, conveying means comprising an endless chain mounted on said frame and having an upper flight disposed along the underside of one shelf of said table, a plurality of angularly disposed fingers fixed to said chain and projecting upwardly therefrom between said upper and lower shelves to engage the arched edges of stacks of sheets supported by the slotted table and for moving the same along the length of said table, a plurality of tiers of bins disposed in side-by-side relationship serially on said frame above and behind said table, each bin being formed to receive sheets stacked flatwise one upon the other, means for periodically dispensing an individual sheet flatwise from each of said bins directly onto said table with the sheets dispensed from each tier being stacked onto the table, the bins of each tier being in superposed relation and being angulated from the vertical rearwardly so as to slope downwardly away from said table to retain the individual sheet stacks in each bin, each bin being open at its forward end and having an opening at its rearward end, said dispensing means including a reciprocatory frame disposed behind said tiers of bins for movement toward and from the bins, individual fingers projecting from said reciprocatory frame and extending into corresponding bins through the open rearward ends thereof and said fingers including means on the forward free ends thereof for engaging and ejecting the uppermost sheet of a stack within each bin, the last mentioned means comprising a carrier having a top wall and depending side walls, said side walls being provided with downwardly and forwardly angulated elongate slots, a roller disposed between said side walls and projecting therebelow and having stub axle ends received in said elongate slots, tensioning means for urging each roller against the top sheet of a stack of sheets in a respective bin, whereby the periphery of each roller is engaged against the undersurface of said top wall of its carrier to be braked thereby so that forward motion of the dispensing means is effective to move the sheets with the rollers and retrograde motion of the dispensing means is effective to produce a predetermined drag upon the next sheet to be dispensed and positively separate the topmost sheet from the underlying sheet in the stack by means of a buckling action and to positively position the same in its proper position in its bin.

16. A collating machine comprising in combination a frame, an elongate longitudinally slotted table rigid with said frame, conveying means including a plurality of spaced angularly disposed fingers projecting upwardly through the slot of said table for conveying stacks of paper sheets along said table, a plurality of tiers of bins mounted on the frame and disposed above and rearwardly of said table for receiving stacks of individual sheets, means for intermittently feeding sheets from each of the individual bins simultaneously for disposition in arched relationship upon said table, common means for driving the conveyor means and for dispensing sheets individually from said bins, such common drive means including one output path continuously driving said dispensing means and a second power output path of intermittent motion type, said common drive means including an input shaft, a dispensing means output shaft directly geared to said input shaft, and a conveying means output shaft geared to said dispensing means output shaft, the gear connection between the dispensing means output shaft and the conveying means output shaft including a pair of gears mounted on a common shaft, one being rigidly affixed to the common shaft and the other being rotatably mounted thereon, a carrier mounted for rotation on said common shaft between the gears thereon and carrying epicyclic gears engaged respectively to the gears on the common shaft and to each other, and means driven by one of the gears on the common shaft for oscillating said carrier.

17. In a collating machine including a frame having a plurality of tiered bins thereon for receiving stacks of individual sheets, a dispensing means for dispensing a single sheet simultaneously from all of said bins, said dispensing means including an arm projecting into each of said bins, means for tensioning said arm to press downwardly against the sheets disposed in a respective bin, and friction means at the free end of said arm for moving the uppermost sheet to a dispensing position and for producing a predetermined drag upon the next uppermost sheet upon retrograde motion of the dispensing arm.

18. In a collating machine including a frame having a plurality of tiered bins mounted thereon for receiving stacks of individual sheets, a dispensing means for dispensing a single sheet simultaneously from all of said bins, said dispensing means including an arm projecting into each of said bins, means for tensioning said arm to press downwardly against the sheets disposed in a respective bin, and friction means at the free end of said arm for moving the uppermost sheet to in dispensing direction and for producing a predetermined drag upon the next uppermost sheet upon retrograde motion of the dispensing arm whereby to disengage the sheet from an underlying sheet, drive means for effecting movement of the dispensing means, conveying means on the frame for intermittently moving dispensed stacks of sheets along the machine, said drive means also being effective to intermittently move said conveying means.

19. In a collating machine including a frame having a plurality of tiered bins thereon for receiving stacks of individual sheets, a dispensing means for dispensing a single sheet simultaneously from all of said bins, said dispensing means including an arm projecting into each of said bins, means for tensioning said arm to press downwardly against the sheets disposed in a respective bin, and friction means at the free end of said arm for moving the uppermost sheet to a dispensing direction and for producing a predetermined drag upon the next uppermost sheet upon retrograde motion of the dispensing arm whereby to disengage the sheet from an underlying sheet, drive means for effecting movement of the dispensing means, conveying means on the frame for intermittently moving dispensed stacks of sheets along the machine, said drive means also being effective to intermittently move said conveying means, said drive means including a drive shaft extending to said dispensing means for continuously operating the same, a shaft driven from said drive shaft, a pair of gears mounted on said last mentioned shaft, one of said gears being fixed for rotation with such last shaft and the other being freely rotatable thereon, a carrier assembly rotatably mounted on said last shaft, a pair of intermeshed planetary gears mounted on said carrier, one of such planetary gears being in mesh with said gear fixed to the last shaft and the other planetary gear being in mesh with said gear freely rotatable on said last shaft, and means for oscillating said carrier.

20. The assembly as defined in claim 19 wherein the last mentioned means comprises a control gear driven from said gear fixed to said last shaft, an eccentric pin carried by said control gear, an arm fixed to said carrier and having an elongated slot therein for following the motion of said eccentric pin.

21. In a sheet collating machine, a frame, a plurality of tiers of bins mounted on said frame for receiving stacks of individual sheets, means for intermittently feeding sheets from each of the individual bins simultaneously, said means including generally vertically disposed parallel linkage members positioned in cooperative pairs and in spaced relationship behind said tiers of bins, the lower ends of said linkage members being pivotally connected to said frame, a carriage carried by the upper ends of said linkage members and disposed in spaced relationship rearwardly of said bins and there being means pivotally interconnecting the upper ends of the pairs of link members, means connected to said link members for oscillating the same toward and away from said tiers of bins, and dispensing members carried by and projecting from said carriage into said bins for dispensing individual sheets therefrom.

22. In a sheet collating machine, a frame, a plurality of tiers of bins mounted on said frame for receiving stacks of individual sheets, means for intermittently feeding sheets from each of the individual bins simultaneously, said means including generally vertically disposed parallel linkage members positioned in cooperative pairs and in spaced relationship behind said tiers of bins, the lower ends of said linkage members being pivotally connected to said frame, a carriage carried by the upper ends of said linkage members and disposed in spaced relationship rearwardly of said bins and there being means pivotally interconnecting the upper ends of the pairs of linkage members, means connected to said linkage members for oscillating the same toward and away from said tiers of bins, dispensing members carried by and projecting from said carriage into said bins for dispensing individual sheets therefrom, a tensioning means for urging said dispensing arms into engagement with sheets disposed in said bins, the forward free ends of said arms carrying friction elements engageable with the sheets.

23. The assembly defined in and by claim 22 wherein said friction means comprises mounting elements carried by said arms and including depending side walls and an interconnecting top wall, a roller disposed between said side walls and having projecting stub axle end portions, said side walls having downwardly and forwardly inclined slots therein receiving said stub axle end portions whereby upon forward movement of the dispensing arms, the roller in each case will be urged against the undersurface of said top surface to be braked thereby whereas upon return motion of the dispensing arms, the tensioning means will be effective to maintain said rollers in a slight frictional contact with said tops to effect a reverse drag upon an underlying sheet.

24. In a sheet collating machine including a frame, a plurality of tiers of bins mounted on said frame and disposed in angulated positions so as to slope downwardly and rearwardly, dispensing means adapted to periodically dispense an individual sheet from a stack in each of said bins, said dispensing means including generally upstanding arm members pivotally interconnected at their lower ends to said frame and being pivotally interconnected at their upper ends so as to form spaced pairs of adjustable parallelograms to assure constant angular relationship of the dispensing means to the bins, a carriage pivotally carried by the upper ends of said arms and disposed in spaced relationship rearwardly of said bins, forwardly projecting dispensing arms mounted on said carriage and being pivotally connected for limited movement in a vertical plane, tensioning means for normally urging said arms to swing their forward free ends downwardly, friction means carried by the forward free ends of said arms for engaging the uppermost sheet of stacks of paper disposed in said bins, and mechanism for oscillating said upstanding arms.

25. The assembly defined in and by claim 24 wherein said friction means comprises mounting elements carried by said arms and including depending side walls and an interconnecting top wall, a roller disposed between said side walls and having projecting stub axle end portions, said side walls having downwardly and forwardly inclined slots therein receiving said stub axle end portions whereby upon forward movement of the dispensing arms, the roller in each case will be urged against the undersurface of said top to be braked thereby whereas upon return motion of the dispensing arms, the tensioning means will be effective to maintain said rollers in engagement with said tops for restricting rotation of the roller whereby to effect a frictional reverse drag upon an underlying sheet to buckle the latter and separate it from another sheet lying thereabeneath.

26. In a collating machine including supporting means, paper holding means mounted on one side of said supporting means, stacked paper holding means on the supporting means above the paper holding means, dispensing means for dispensing individual sheets of paper from the said stack of paper disposed rearwardly of and extending into and engaging the stacked paper, said paper holding means comprising vertically staggered shelves which provide a longitudinally extending space between inner adjacent edges thereof, conveying means mounted on said supporting means, said conveying means adjacent the shelves and including angularly disposed paper engaging means extending through said space between said shelves, common drive means for said dispensing and conveying means including constant drive means for said dispensing means and intermittent drive means for said conveying means.

27. In a collating machine defined in claim 26 wherein said paper engaging means include friction means comprising a housing including depending side walls and an interconnecting top wall, a roller disposed between said side walls and having projecting stub axle end portions, said side walls having downwardly and forwardly inclined slots therein receiving said stub axle end portions.

28. In a collating machine defined in claim 26 wherein said supporting means includes paper jogging means pivotally mounted thereon, jogger actuating means secured to said conveying means and adapted to contact and pivot said jogger upon continued movement of said conveying means.

References Cited in the file of this patent

UNITED STATES PATENTS

| | | |
|---|---|---|
| 1,911,884 | Darbaker | May 30, 1933 |
| 2,308,804 | Dager | Jan. 19, 1943 |
| 2,505,925 | Von Haase | May 2, 1950 |
| 2,588,946 | Walden et al. | Mar. 11, 1952 |
| 2,621,039 | Kleineberg et al. | Dec. 9, 1952 |
| 2,702,189 | Zugel et al. | Feb. 15, 1955 |
| 2,722,414 | Smith | Nov. 1, 1955 |
| 2,770,456 | Magarinos et al. | Nov. 13, 1956 |
| 2,793,032 | Van Dusen | May 21, 1957 |
| 2,852,250 | George | Sept. 16, 1958 |